(12) United States Patent
Liu et al.

(10) Patent No.: US 10,635,427 B2
(45) Date of Patent: Apr. 28, 2020

(54) FORWARD COMPATIBILITY PROCESS

(71) Applicant: PAYPAL, INC., San Jose, CA (US)

(72) Inventors: Yang Liu, Daly City, CA (US); David Lin, Saratoga, CA (US)

(73) Assignee: PayPal, Inc., San Jose, CA (US)

( * ) Notice: Subject to any disclaimer, the term of this patent is extended or adjusted under 35 U.S.C. 154(b) by 150 days.

(21) Appl. No.: 15/886,622

(22) Filed: Feb. 1, 2018

(65) Prior Publication Data
US 2018/0225134 A1    Aug. 9, 2018

Related U.S. Application Data

(60) Provisional application No. 62/454,608, filed on Feb. 3, 2017.

(51) Int. Cl.
*G06F 9/44* (2018.01)
*G06F 8/65* (2018.01)

(52) U.S. Cl.
CPC .................... *G06F 8/65* (2013.01)

(58) Field of Classification Search
CPC ..... G06F 8/65; G06F 8/71; G06F 8/24; G06F 16/219
See application file for complete search history.

(56) References Cited

U.S. PATENT DOCUMENTS

| 6,601,233 B1 * | 7/2003 | Underwood | G06F 8/24 717/100 |
| 9,064,233 B2 * | 6/2015 | Woods | G06F 16/9577 |
| 9,760,606 B1 * | 9/2017 | Wilczynski | G06F 16/215 |
| 2008/0065781 A1 * | 3/2008 | Davis | H04L 65/607 709/231 |
| 2014/0129182 A1 * | 5/2014 | Weatherhead | G06F 17/50 703/1 |

* cited by examiner

*Primary Examiner* — Duy Khuong T Nguyen
(74) *Attorney, Agent, or Firm* — Haynes and Boone LLP

(57) ABSTRACT

A computer implemented method for forward compatibility of data objects is discussed. The method includes receiving a data object from a server, where the data object includes a first data portion and a second data portion. The method includes determining that the data object is not recognizable. The method includes, in response to not recognizing the data object, identifying the first data portion as a default data and identifying the second data portion as unrecognized data. The method also includes processing the data object using the default data.

20 Claims, 5 Drawing Sheets

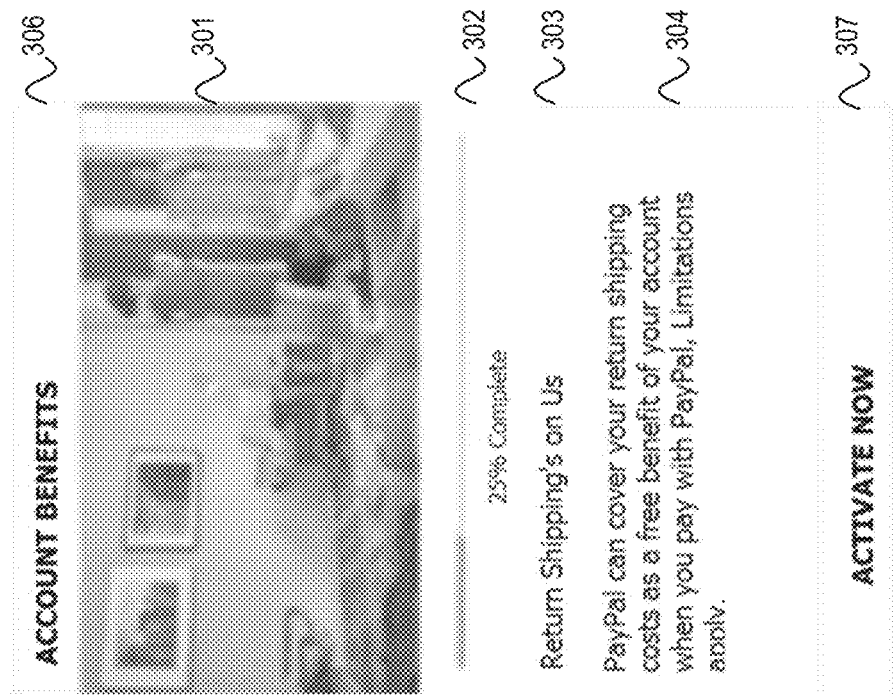
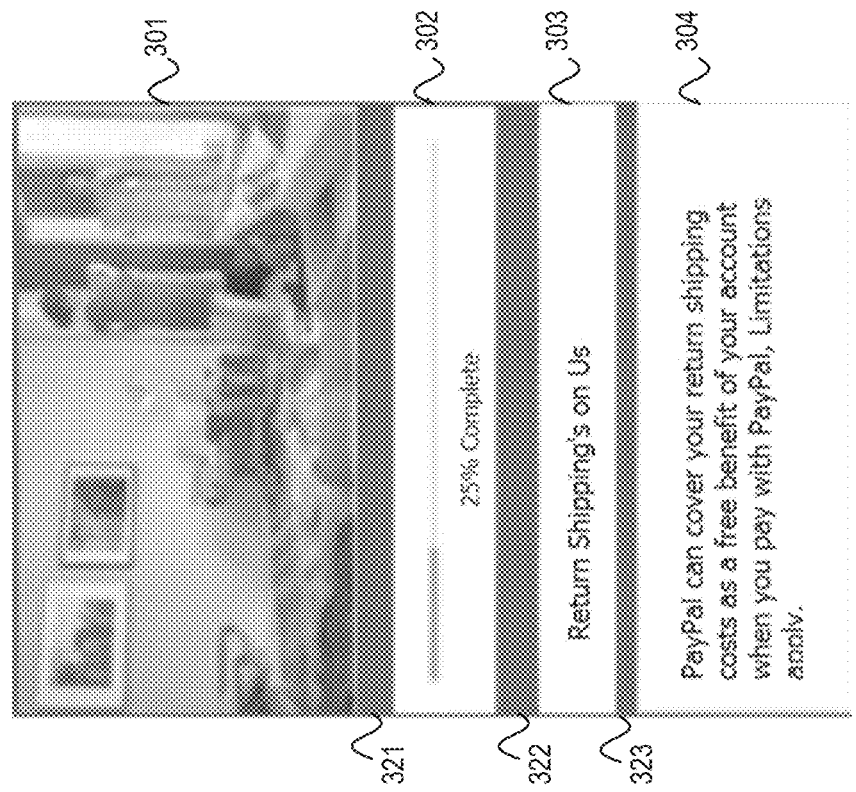
FIG. 3B
FIG. 3A

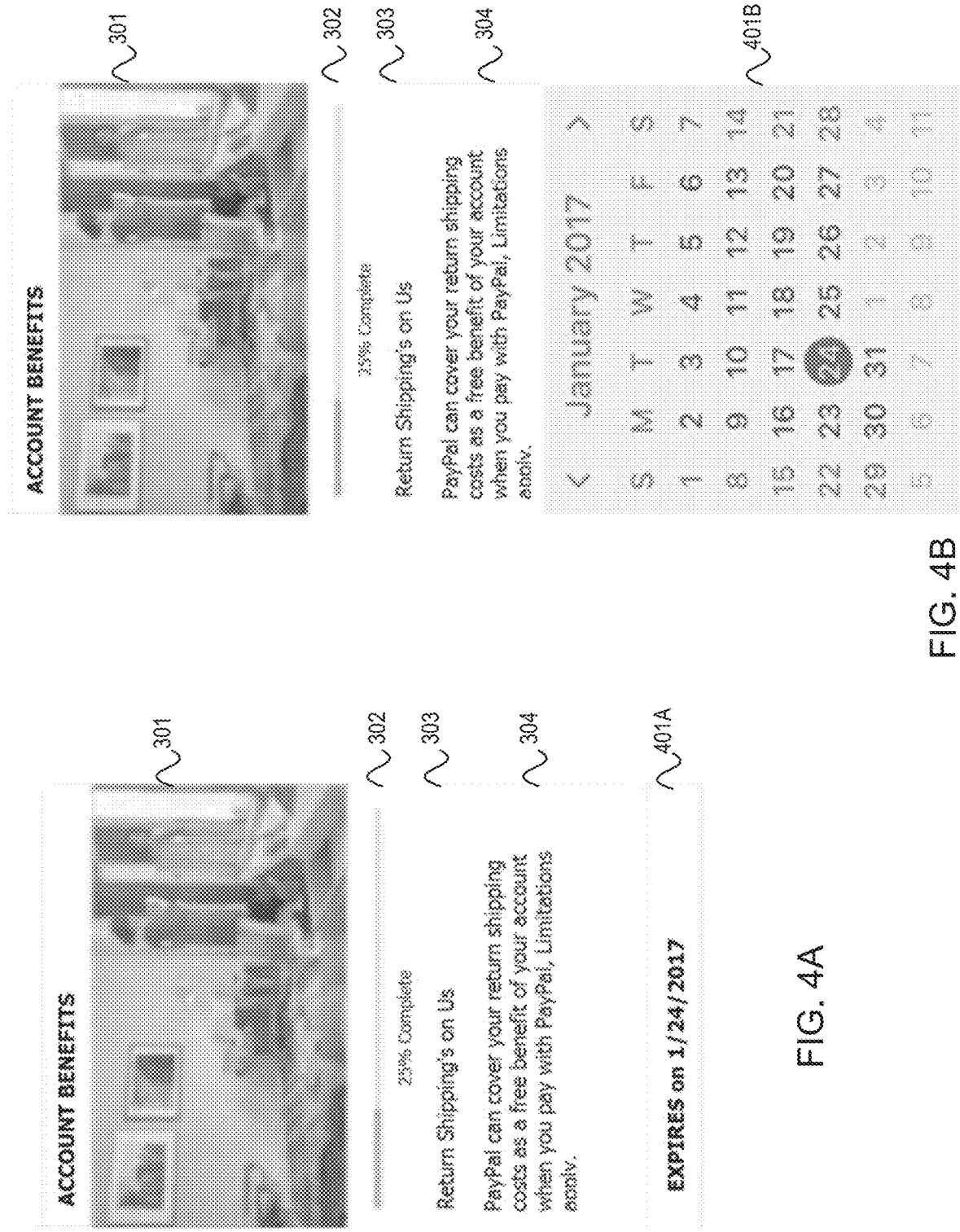

FORWARD COMPATIBILITY PROCESS

RELATED MATTERS

This application claims priority benefit of U.S. Provisional Patent Application Ser. No. 62/454,608, titled "Forward Compatibility Process" filed on Feb. 3, 2017.

TECHNICAL FIELD

The present disclosure relates to creating applications that have forward compatibility for future features that are intended for newer versions of the applications.

BACKGROUND

One major problem with native device applications is handling new versions and any associated new features. Often times device applications are configured to receive and parse data objects or structures provided to the applications from servers. The applications will usually expect certain data objects or structures which the applications are programmed to handle. However, as developers iterate on the versions of the applications, new features can be added to the updated applications. These new features may use new data objects and/or structures provided by the servers. However, whereas the updated applications are configured to handle new data objects and/or structures, old applications that have not been updated won't be able to properly handle these new data objects and/or structures.

The traditional solutions to this problem include either ignoring new data objects or stopping supporting older versions of the application, hosting the entire application on the server (e.g. web applications), maintaining backward compatibility of the server by tailoring information based on the version of the application, and/or creating one or more unused data structures for that application which are initially unused and intended for use as future developments are made on the application. However, none of these solutions allow for native, legacy applications to take advantage of new features. Thus, it would be beneficial if old applications could have forward compatibility with new features, data structures, and/or data objects that are developed without having to update the application.

BRIEF DESCRIPTION OF THE FIGURES

FIG. 3A illustrates an example of several individual displays associated with data objects.

FIG. 3B illustrates an example of displayed objects that are stitched together to form an unbroken display of data.

FIG. 4A illustrates an example of displayed objects received from a server by a client application that does not recognize the data object.

FIG. 4B illustrates and example of displayed objects where the client application is capable of recognizing and/or implementing.

Figure 1:
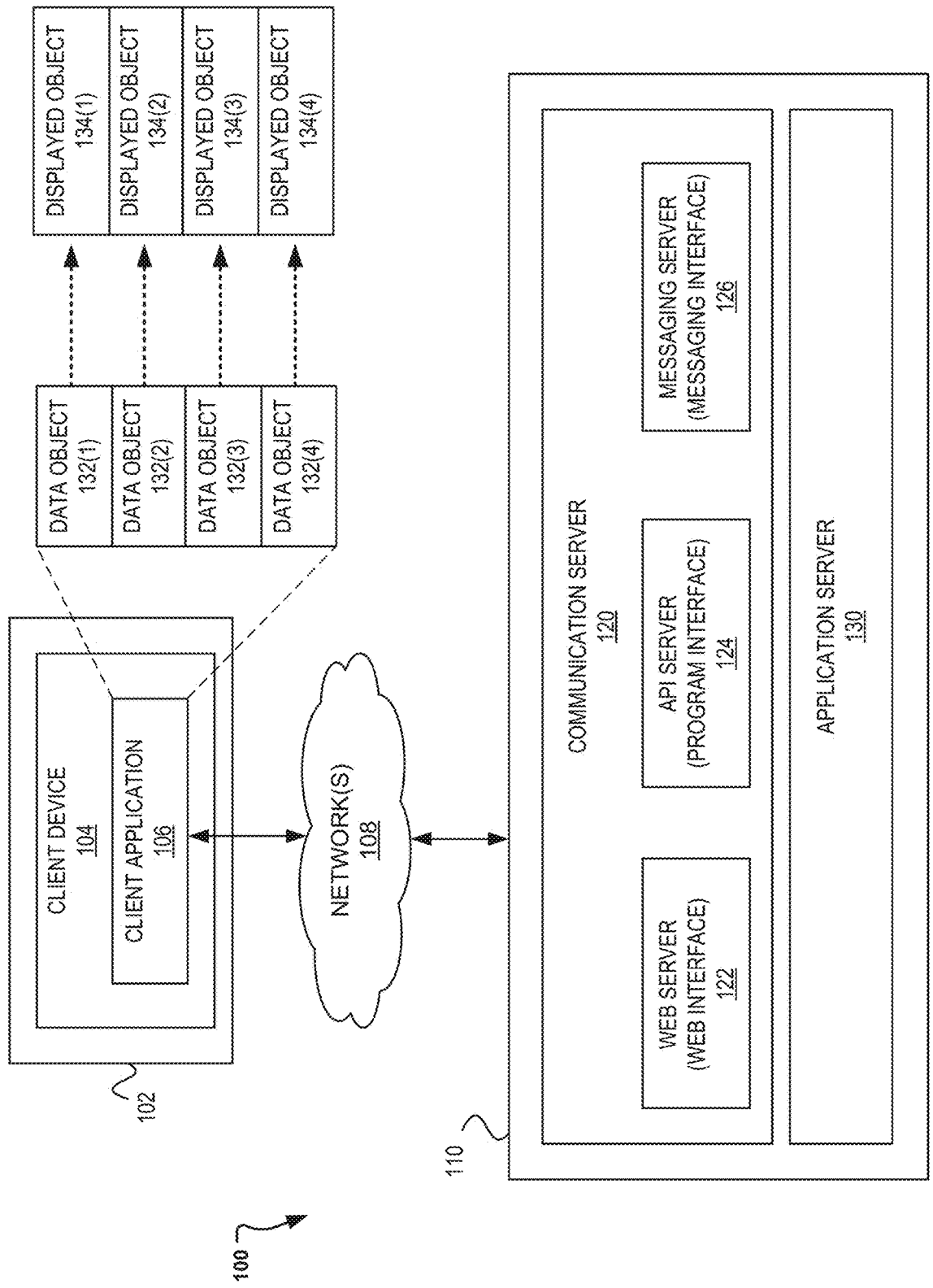
FIG. 1 is a block diagram of an example computing system for implementing a forward compatible client application and using forward compatible data objects.

The detailed description that follows provides several embodiments and advantages of the system of the present disclosure. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. However, one skilled in the art would recognize that they may practice some embodiments without some or all of these specific details. The particular embodiments disclosed herein are meant to be illustrative but not limiting. One skilled in the art may realize other elements that, although not specifically described here, are within the scope and the spirit of this disclosure. Also, to avoid unnecessary repetition, one or more features shown and described in association with one embodiment may be incorporated into other embodiments unless expressly described otherwise or if the one or more features would make an embodiment non-functional.

FIG. 1 illustrates, in block diagram format, an example embodiment of a computing system adapted for implementing one or more embodiments disclosed herein to enable forward compatibility for applications and using forward compatible data objects. As shown, a computing system 100 may comprise or implement a plurality of servers and/or software components that operate to perform various methodologies in accordance with the described embodiments. Example servers may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

The computing system 100 may include, among various devices, servers, databases and other elements, one or more clients 102 that may comprise or employ a client device 104. The client device 104 can be implemented using a laptop, a mobile computing device, a tablet, a PC, a wearable device, and/or any other computing device having computing and/or communications capabilities in accordance with the described embodiments. The client device 104 may include a cellular telephone, smart phone, electronic wearable device (e.g., smart watch, virtual reality headset), or another similar mobile device that a user may carry on or about his or her person and access readily.

The client device 104 can host a client application 106 (e.g., a native application), such as a system program and/or an application program to perform various computing and/or communications operations. Example system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, and/or application programming interfaces (APIs), and so forth. Example application programs may include, without limitation, a web browser application, messaging application, contacts application, calendar application, electronic document application, database application, media application (e.g., music, video, television), and/or a location-based services (LBS) application (e.g., GPS, mapping, directions, positioning systems, geolocation, point-of-interest, locator) that may utilize hardware components such as an antenna, and so forth. The client application 106 may display various graphical user interfaces (GUIs) (e.g., on the client device 104) to present information to and/or receive information from one or more users of the client device 104. In some embodiments, the client application 106 may be configured to conduct some or all of the functionalities and/or processes discussed below.

As shown, the client device 104 may be communicatively coupled via one or more networks 108 to a network-based system 110 and/or one or more 3rd part devices (not shown). The network-based system 110 may be configured to establish one or more communications sessions between the network-based system 110 and the client device 104 and/or the client application 106. Accordingly, a communications session between the client device 104 and the network-based system 110 may involve an unidirectional and/or bidirectional exchange of data and may occur over one or more of the networks 108 depending on the mode of communication of the unidirectional and/or bidirectional exchange. While the embodiment of FIG. 1 illustrates the computing system 100 deployed in a client-server operating environment, it is to be understood that other suitable operating environments and/or architectures may be used in accordance with the described embodiments.

Data communication between the client device 104 and the network-based system 110 may be transmitted over the one or more networks 108 such as the Internet, a WAN, a WWAN, a WLAN, a mobile telephone network, a landline telephone network, personal area network, and/or other suitable networks. For example, the client device 104 may communicate with the network-based system 110 over the Internet or other suitable WAN by sending and/or receiving data via interaction with a website, e-mail, IM session, and/or a video messaging session. Any of a wide variety of suitable communication between the client device 104 and the network-based system 110 may take place, as will be readily appreciated. For example, the client device 104 and the network-based system 110 can communicate data via wireless communications.

The network-based system 110 includes a communications server 120 to provide suitable interfaces that enable communication using various modes of communication via the one or more networks 108. The communications server 120 includes a web server 122, an Application Programming Interface (API) server 124, and/or a messaging server 126 to provide interfaces to the application server 130. The application server 130 may be configured to provide various services to client devices and/or 3rd party devices that communicate with the network-based system 110. In various embodiments, the client device 104 may communicate with the application server 130 via one or more of a web interface provided by the web server 122, a programmatic interface provided by the API server 124, and/or a messaging interface provided by the messaging server 126. It may be appreciated that the web server 122, the API server 124, and the messaging server 126 may be configured to communicate with various types of client devices, and/or of client applications, and may interoperate with each other in some implementations.

The web server 122 may be configured to communicate with web clients and/or applications such as a web browser, web browser toolbar, desktop widget, mobile widget, web-based application, web-based interpreter, virtual machine, mobile applications, and so forth. The API server 124 may be configured to communicate with various client applications, such as the client application 106, and include an implementation of an API for the network-based system 110. The messaging server 126 may be configured to communicate with various messaging clients and/or applications such as e-mail, IM, SMS, MMS, telephone, VoIP, video messaging, IRC, and so forth. The messaging server 126 may provide a messaging interface to enable access by the client device 104 to the various services and functions provided by the application server 130.

The application server 130 may be a server that provides various services to client devices. The application server 130 may include multiple servers and/or components which may communicate and provide information, such as data objects, to the client device 104. The application server 130 can thus provide data objects, such as data objects 132(1)-132(4), to the client application 106. The data objects can be implemented as self-contained representations of data. Each data object can define both structure of the data it contains, and also methods for accessing the data. In some embodiments, a data object can be instantiated based on a corresponding data object definition. In some embodiments, the data objects includes data, which in turn can include content such as text data. The data can also include instructions indicating how to display certain content (e.g., instructions how to use the content with custom graphics such as a calendar). The application server 130 can communicate the data objects 132(1)-132(4) over the network(s) 108 to the client application 106.

As discussed herein, a structure, content, and/or definition of some of the data objects 132(2)-132(4) can be updated by an updated application server 130. One of the data objects, such as the data object 132(4), can be a new data object (which can also be an updated version of a previous data object) that is generated only when the application server 130 is updated (i.e., a non-updated application server 130 does not use and/or provide the data object 132(4)). An example of a new data object is discussed below. The application server 130 can provide the data objects 132(1)-132(4) via one or more techniques over the network 108. In some embodiments, the application server 130 can generate and/or use data objects in accordance with forward compatibility functionality described herein.

For example, the application server 130 can generate (e.g., by instantiating) the data object 132(4) (or a corresponding data object that is transmitted to, and received by, the client application 106 as the data object 132(4)) that is not recognizable and/or implementable by the client application 106. Similarly, the application server can generate the data object 132(1) (or a corresponding data object) that is recognizable and/or implementable by the client application 106.

The client application 106 can receive the data objects 132(1)-132(4). The client application 106 can determine whether the data objects 132(1)-132(4) are recognizable and/or implementable. Typically, the client application 106 can recognize data content of data objects, and can implement instructions of data objects. For example, the client application 106 can determine that the data objects 132(1)-132(3) (e.g., created by an application server prior to certain updates) are recognizable and/or implementable and that the data object 132(4) (i.e., the new data object) is not recognizable and/or implementable. The client application 106 can handle (i.e., process) the data objects 132(1)-132(3).

Processing of the data objects 132(1)-132(3) can include displaying the data objects 132(1)-132(3) as displayed objects 134(1)-134(3), respectively. For example, the client application 106 can recognize the data of the data object 132(1) to display it via the displayed object 134(1). The client application 106 can determine that the data of the data object 132(2) is recognizable and implementable, and implement instructions of the data object 132(2) to display the content of the data object 132(2) as the displayed data object 134(2).

The client application 106 can, in response to not recognizing the data object 132(4), identify a first data portion of the data object 132(4) as a default data, and identify a second data portion of the data object 132(4) as unrecognized and/or not implementable data. The client application 106 can process the data object 132(4) using the default data, such as to display a corresponding displayed object 134(4). In some implementations, the client application 106 can use default instructions of the data object 132(4) to display content of the data object 132(4) as the displayed data object 134(2).

Figure 2:
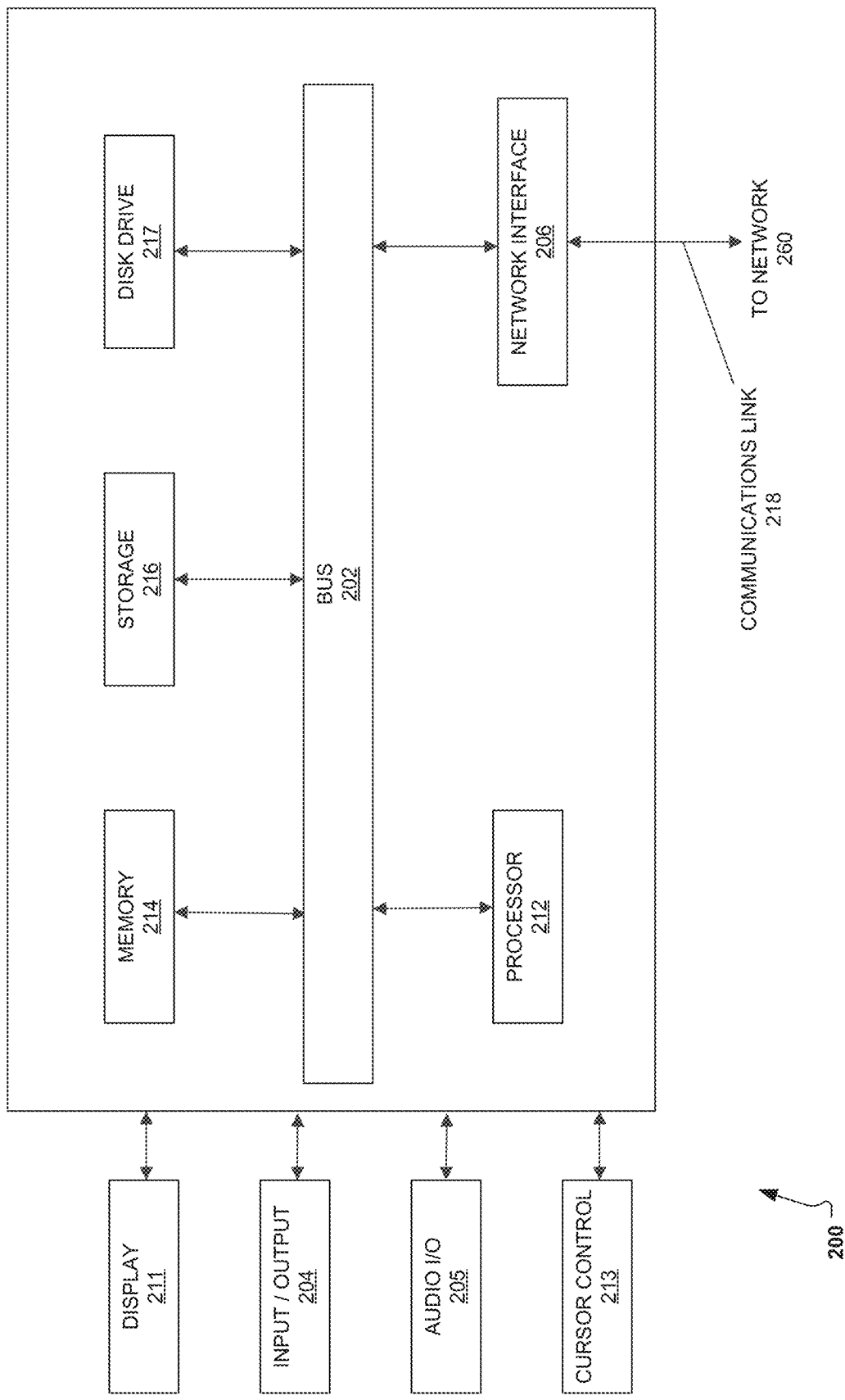
FIG. 2 is a block diagram of an example computer system suitable for implementing one or more devices of the computing system in FIG. 1.

FIG. 2 illustrates an example computer system 200 in block diagram format suitable for implementing on one or more devices of the computing system in FIG. 1. In various implementations, a device that includes the computer system 200 may comprise a personal computing device (e.g., a smart or mobile phone, a computing tablet, a personal computer, laptop, wearable device, and/or a PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as the computer system 200 in a manner as follows.

The computer system 200 may include a bus 202 or other communication mechanisms for communicating information data, signals, and information between various components of the computer system 200. Components include an input/output (I/O) component 204 that processes a user action, such as selecting keys from a keypad/keyboard, selecting one or more buttons, links, actuatable elements, etc., and sends a corresponding signal to the bus 202. The I/O component 204 may also include an output component, such as a display 211 and a cursor control 213 (such as a keyboard, keypad, mouse, touchscreen, etc.). In some examples, the I/O component 204 may include an image sensor for capturing images and/or video, such as a complementary metal-oxide semiconductor (CMOS) image sensor, and/or the like. An audio input/output component 205 may also be included to allow a user to use voice for inputting information by converting audio signals. The audio I/O component 205 may allow the user to hear audio.

A transceiver or network interface 206 transmits and receives signals between the computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 212, which may be a micro-controller, digital signal processor (DSP), or other processing component, processes these various signals, such as for display on the computer system 200 or transmission to other devices over a network 260 via a communication link 218. The communication link 218 may be a wireless communication in some embodiments. The processor 212 may also control transmission of information, such as cookies, IP addresses, images, and/or the like to other devices.

Components of the computer system 200 also include a system memory component 214 (e.g., RAM), a static storage component 216 (e.g., ROM), and/or a disk drive 217. The computer system 200 performs specific operations by the processor 212 and other components by executing one or more sequences of instructions contained in the system memory component 214. Logic may be encoded in a computer-readable medium, which may refer to any medium that participates in providing instructions to the processor 212 for execution. Such a medium may take many forms, including but not limited to, non-volatile media, volatile media, and/or transmission media. In various implementations, non-volatile media includes optical or magnetic disks, volatile media includes dynamic memory such as the system memory component 214. The transmission media includes coaxial cables, copper wire, and fiber optics, including wires that comprise the bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 200. In various other embodiments of the present disclosure, a plurality of computer systems (such as the computer system 200) coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable media. It is also contemplated that software identified herein may be implemented using one or more computers and/or computer systems, networked and/or otherwise. Such software may be stored and/or used at one or more locations along or throughout the system, at the client device 106, the network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

In some embodiments of the present disclosure, a process for enabling future compatibility of native applications (e.g., client applications) is disclosed. In some embodiments, to enable future compatibility of applications, the system is configured to receive and process multiple data objects from a server, and stitch the pieces together to form a continuous unbroken display of these data objects. The application (e.g., the client application 106) is configured such that the data objects can be stitched together in a display as one uninterrupted view, no matter the order in which that data objects are received, what each of the data objects contains.

The client application 106 may also be configured to handle particular data objects, such as images, stylistic formats, types of text, and or other data objects which may be specific to the client application 106. Handling of a data object can include recognizing the data object (e.g., recognize data content of the data object) and/or implementing the data object (e.g., implementing instructions of the data object). For example, the client application 106 may be configured to handle certain data objects in a particular manner, such as display a particular data object as a displayed object of a progress bar. However, the client application 106 would also need to be configured to handle new data objects that a future version of the client application 106 may be capable of handling, but is unknown (i.e., unrecognizable and/or not implementable by the current version). For example, an updated version of the client application 106 may be configured to receive and process (e.g., recognize and/or implement) a calendar data object, in order to display a displayed object of a calendar display.

However, a legacy version of the client application 106 may not have the calendar data object feature, i.e., the client application 106 may not be able to process the calendar data object. Instead, the legacy version of the client application 106 can handle the calendar data object without having been updated to recognize and/or implement the calendar data object. In other words, the legacy version of the client application 106 may be configured to handle the calendar data object and render the information in the calendar data object, despite the client application 106 not having a protocol for fully processing any new features of that particular data object. This may be accomplished by causing the client application 106 to handle new (or updated) data objects in a default way such that the information is provided to the user seamlessly without disrupting the display of the elegant uniform view.

As described herein, this forward object compatibility may be possible by using data objects that include a default data format, such as by having application servers generate data objects with such default data formats. Furthermore, the client applications are configured to process data using the default data format when the data object is unrecognized and/or not implementable. The default data may be placed (e.g., by the application server) in a location of the data object that a legacy client application will be able to reliably identify. The data object can also include an indicator indicating which part of the data object is the default data, where the indicator is accessed by the legacy client applications.

FIGS. 3A and 3B illustrates how data objects can be displayed and stitched together to form an unbroken or seamless display of data.

As shown, in FIG. 3A, there are unstitched displays of displayed objects 301-304 that correspond to underlying data objects (e.g., the data objects 132(1)-132(4)). The application server 130 may have provided to the client application 106 the data objects 132(1)-132(4). The client application 106 may have processed the data objects 132(1)-132(4) to display the corresponding displayed objects 301-304 as shown. In the shown example, the client application 106 can recognize and display an image data object of the data object 132(1) as the displayed object 301 (corresponding to the displayed object 134(1) of FIG. 1). Similarly, the client application 106 can recognize, implement, and display a progress data object of the data object 132(2) as the displayed object 302 (corresponding to the displayed object 134(2)).

The client application 106 can access data objects 132(3) and 132(4), and determine these data objects 132(3) and 132(4) are not recognizable and/or not implementable. Instead, the client application 106 can handle the data objects 132(3) and 132(4) in a default manner. Thus, the client application 106 can display displayed objects 134(3) and 134(4) as text data objects 303 and 304, respectively, by using default data of each the data objects 132(3) and 132(4). Furthermore, since the data objects 132(3) and 132(4) are not recognizable and/or not implementable, the client application 106 can display stiches 321, 322, and/or 323. The stiches may be displayed by the client application 106 as a result of displaying the text data objects 303 and 304 from processing the default data (instead of processing the unrecognized and/or not-implemented data object portions). It is noted that an upgraded version of the client application 106 can recognize and/or implement each of the data objects 132(3) and 134(4), and display corresponding displayed objects 134(3) and 134(4) without using stiches.

As shown in FIG. 3B, the client application 106 can stitch together the displayed objects 301-304 to form a single seamless and continuous display of the data objects 301-304, including the text data objects 303 and 304 that are displayed as a result of processing default data. As a result, the display of FIG. 3B looks unbroken and has no indication that the displayed objects are separate. This may be achieved in one or more manners, such as maintaining a particular color scheme as the background or "whitespace" for the display of the data objects.

Also, as shown in FIG. 3B there may be displays of native application information 306 and 306 that may be stored with the client application 106 rather than a data object received from a server for display. The client application 106 may be configured to display the displayed objects in a format that can be seamlessly stitched together. The client application 106 may stitch the displayed objects together into a single view that appears unbroken to the user as shown in FIG. 3B. The display of the native application information 306 and 307 may also be stitched to the displayed objects that the client application 106 receives from the application server 130.

FIGS. 4A and 4B illustrate how a legacy version of the client application 106 handles new data objects from the application server 140 (FIG. 4A) as compared to how an updated version of the client application 106 handles the same new data object (FIG. 4B). As shown, FIGS. 4A and 4B include the data object displays of the displayed objects 301-304 of FIG. 3. FIGS. 4A and 4B also have additional data object displays 401A and 401B, respectively, for displaying a new data object received by the client application 106. The new data object may be a data object created by an updated application server 130 for handling by the updated version of the client application 106.

As shown in FIG. 4B, the updated client application 106 can correctly handle the new data object by displaying a displayed object 401B of a new graphic of a calendar and indicator of the date. In contrast, the legacy version of the client application 106 may not have the functionality or configuration to recognize or utilize the new data object. However, due to the way the client application 106 is configured, important data from the new data object is still displayed as displayed object 401A. The displayed object 401A still has the important information, which in this case is an expiration date, i.e., the important data can be a simple version 401A of the complex graphics of the displayed object 401B. Furthermore, the information can be placed in the correct location (e.g. at the bottom, although in other example it may be located somewhere else, such as between the displayed data 303 and 304). The correct location be an unused location that would be occupied by the properly implemented object display 401B. The information can be seamlessly stitched together with other displayed objects. So, although the legacy version of the application 106 of FIG. 4A does not have the code to properly handle the new data object as shown in FIG. 4B, it still presents the information and is compatible with the new data object that it received.

It is noted that a problem that has plagued native client applications, and more specifically, mobile applications at the time of this application, is that legacy client applications do not have the ability to handle new data objects. As a result, when the legacy client application receives a new data object, the legacy client application can glitch, or ignore the new data object. Most solutions to this problem revolve around forcing updates to the client application (e.g., automated night time or charging time application updates). The other solution is to have the client application not be native and instead be implemented as a web application. However, this solution allows for forward compatibility with new data objects for native legacy client applications.

Below is an example implementation of a data object that allow for forward compatibility. The application server 130 can generate this forward compatible data object, which then can be processed by either the legacy version of the client application 106 or the updated version of the client application 106.

```
"accountMessage": {
   "headerColor": "#0198E1",
   "headerTextColor": "#ffffff",
   "bodyColor": "#ffffff",
   "bodyTextColor": "#000000",
   "footerColor": "#ffffff",
   "footerTextColor": "#0198E1",
   "header": "DEFAULT_NONE",
   "objectType": "AccountMessageLayout"
   "FallBackUI": {
      "fallbackString":"Expires on 1/24/2017"
   }
}
```

In the above example, the data object "accountMessage" that is an object type AccountMessageLayout which has data for handling by an application. If the client application is up to date and able to handle AccountMessageLayout objects, the client application will use the data in the accountMessage data object to create the data object display (i.e., the displayed object). For example, an updated client application may display the displayed object 401B for this data object.

In contrast, a legacy version of the client application does not have procedures to handle the AccountMessageLayout object, and instead uses the FallBackUI sub object. The FallBackUI sub object implements default data that all legacy client applications can handle. The default data can include data content that can be recognized using text or HTML data. The default data can include default instructions that legacy client applications can implement. In this manner, client applications will have forward compatibility with new data objects through the fall back sub-object by being able to access and process the default data. As such, a legacy client application may display content of the default data of the new data object and/or implement some functionality of the default data, without having the user to update the client application. As shown in FIG. 4A, a legacy client application without modules for handling the new AccountMessageLayout object type may display the text data of the FallBackUI sub object as shown by reference 401A, and ignore the other information and/or instructions of the new data object.

Figure 5:
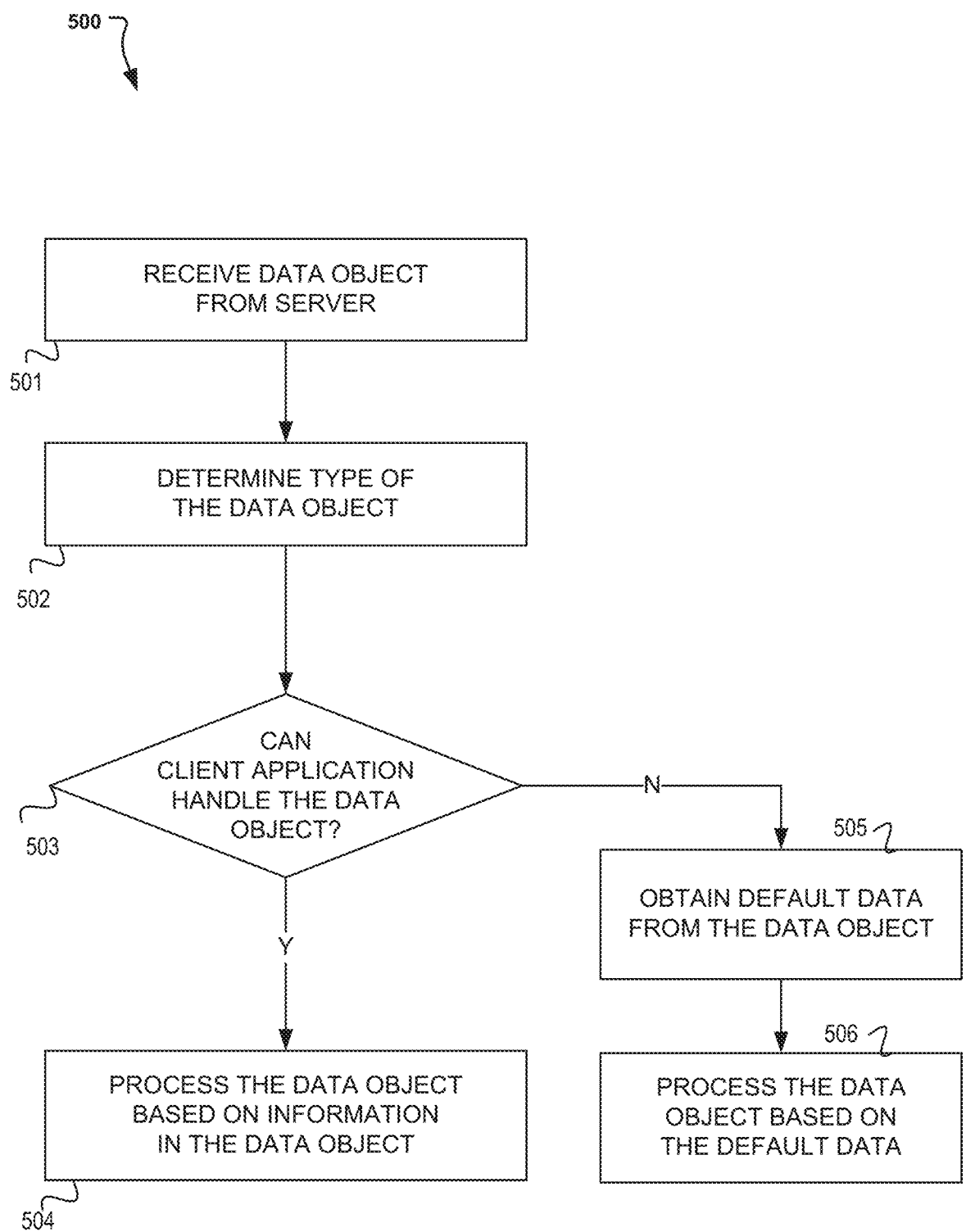
FIG. 5 illustrates and example process in block diagram format of implementing a client application with forward compatibility and using forward compatible data objects.

FIG. 5 illustrates an example process performed by a client application that is forward compatible. At operation 501, the client application, when executed by the client device, may receive a data object with instructions for either display or handling. For example, the data object may be an object for displaying data in a particular form, such as a progress bar, calendar, and/or the like. The data object may include information such as sizing, color, order, location, whether it should be an actuatable button, and/or the like.

At operation 502, the client application may determine the data object type. The data object type may indicate how the data object is to be handled, including how data content is to be displayed. Furthermore, the data object may be formatted to include default instructions for legacy client applications that do not recognize and/or cannot implement the data object.

At operation 503, the client application may determine or attempt to recognize the data object. Depending on whether the application is up to data and/or the version of the client application, the client application may or may not recognize or be configured to properly implement the data object.

If the client application is a version capable of recognizing and/or implementing the data object received at operation 501, the client application may continue to operation 504 where the client application properly handles the data object. For example, the client application may display the data content of the data object in a particular way as implemented by new instructions associated with the data object.

If the client application is a version incapable of recognizing or implementing the data object, the client application may continue to operation 505, wherein the client application will obtain the default data from the data object. In some embodiments, the default data may be text or hypertext of the information in the data object. The default information can include default instructions on how to process the data content.

From operation 505, the system may continue to operation 506 wherein the client application processes the data object based on the default data. For example, the client application may display the text in a predetermined default manner associated with the application. For example, the client application may display the text using default fonts, default color schemes, and/or the like.

The client application may be configured to display data associated with data objects received from an application server. In some examples, the order in which the data is displayed may depend on the order in which the information is received. Furthermore, the display of the data may be stitched together in a seamless manner such that the display looks like a singular object when viewed by a user. In this manner, a user isn't alerted to the fact that a piece of the data displayed, such as the data associated with an unsupported data object, is in a default manner rather or separate from other information displayed.

The preceding disclosure is not intended to limit the present disclosure to the precise forms or particular fields of use disclosed. As such, it is contemplated that various alternate embodiments and/or modifications of the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory storing instructions; and
one or more hardware processors coupled to the non-transitory memory and configured to execute the instructions from the non-transitory memory to cause the system to perform operations comprising:
receiving, from a server, a plurality of data objects for display as part of a user interface on a device;
determining that a first data object from the plurality of data objects is recognizable by an application of the system;
in response to determining that the first data object is recognizable by the application, extracting, from the first data object, a first data portion corresponding to a first data portion type;
determining that a second data object from the plurality of data objects is not recognizable by the application of the system;
in response to determining that the second data object is not recognizable by the application, extracting, from the second data object, a second data portion corresponding to a second data portion type different from the first data portion type;
generating a presentation of the plurality of data objects based on the first data portion of the first data object and the second data portion of the second data object;
inserting, within the presentation of the plurality of data objects, an indicator that at least one of the plurality of data objects is not supported by the application; and
providing the presentation of the plurality of data objects on the user interface of the device.

2. The system of claim 1, wherein the indicator comprises a colored block disposed between a pair of displayed objects from the plurality of data objects.

3. The system of claim 1, wherein the generating the presentation of the plurality of data objects comprises:
determining a location for displaying the second data portion of the second data object based on a displayed location of the first data portion of the first data object.

4. The system of claim 1, wherein the second data object further comprises a third data portion corresponding to the first data portion type, and wherein the second data portion of the second object corresponds to a different version of the third data portion of the second data object.

5. The system of claim 1, wherein the generating the presentation comprises:
determining a first display location on the user interface for displaying the first data portion of the first data object based on a display parameter within the first data object; and
determining a second display location for displaying the second data portion of the second data object based on unused display locations on the user interface after displaying the first data portion of the first data object.

6. The system of claim 1, wherein the operations further comprise determining that the second data portion of the second data object corresponds to the second data portion type based on an identifier included in the second data portion of the second data object.

7. The system of claim 1, wherein the determining that the second data object is not recognizable by the application comprises determining that the application does not include programming code for rendering the second object.

8. The system of claim 1, wherein the operations further comprise:
updating the application from a legacy version to an updated version;
determining that the second data object is recognizable by the updated application;
in response to determining that the second data object is recognizable by the updated application, extracting, from the second data object, a third data portion corresponding to the first data portion type;
generating a second presentation of the plurality of data objects based on the first data portion of the first data object and the third data portion of the second data object; and
providing the second presentation of the plurality of data objects on the user interface of the device.

9. The system of claim 8, wherein the operations further comprise:
in response to determining that the second data object is recognizable by the application, disregarding the second data portion of the second data object.

10. A method comprising:
receiving, from a server, a plurality of data objects for display as part of a user interface on a device;
determining that a first data object from the plurality of data objects is recognizable by an application;
in response to determining that the first data object is recognizable by the application, extracting, from the first data object, a first data portion corresponding to a first data portion type;
determining that a second data object from the plurality of data objects is not recognizable by the application;
in response to determining that the second data object is not recognizable by the application, extracting, from the second data object, a second data portion corresponding to a second data portion type different from the first data portion type;

generating a presentation of the plurality of data objects based on the first data portion of the first data object and the second data portion of the second data object;

inserting, within the presentation of the plurality of data objects, an indicator that at least one of the plurality of data objects is not supported by the application; and providing the presentation of the plurality of data objects on the user interface of the device.

11. The method of claim 10, wherein the indicator is provided between at least one pair of displayed objects from the plurality of data objects.

12. The method of claim 10, wherein the second data object further comprises a third data portion corresponding to the first data portion type, and wherein the second data portion of the second object corresponds to a different version of the third data portion of the second data object.

13. The method of claim 10, further comprising:

determining a first display location on the user interface for displaying the first data portion of the first data object based on a display parameter within the first data object; and determining a second display location for displaying the second data portion of the second data based on an unused display location on the user interface after displaying the first data portion of the first data object.

14. The method of claim 10, further comprising determining that the second data portion of the second data object corresponds to the second data portion type based on an identifier included in the second data portion of the second data object.

15. The method of claim 10, further comprising:

updating the application from a legacy version to an updated version;

determining that the second data object is recognizable by the updated application;

in response to determining that the second data object is recognizable by the updated application, extracting, from the second data object, a third data portion corresponding to the first data portion type;

generating a second presentation of the plurality of data objects based on the first data portion of the first data object and the third data portion of the second data object; and providing the second presentation of the plurality of data objects on the user interface of the device.

16. A non-transitory machine-readable medium having stored thereon machine-readable instructions executable to cause a machine to perform operations comprising:

accessing a data object for display as part of a user interface on a user device, wherein the data object comprises a first sub object and a second sub object;

determining that the first sub object is implementable by an application;

in response to determining that the first sub object is implementable by the application, extracting, from the first sub object, a first data portion corresponding to a first data portion type;

determining that the second sub object is not implementable by the application;

in response to determining that the second sub object is not implementable by the application, extracting, from the second sub object, a second data portion corresponding to a second data portion type different from the first data portion type generating a presentation of the data object based on the first data portion of the first sub object and the second data portion of the second sub object;

inserting, within the presentation of the data object, an indicator that at least one sub object is not supported by the application; and providing the presentation of the data object on the user interface of the device.

17. The non-transitory machine-readable medium of claim 16, wherein the indicator comprises a colored block disposed within a predetermined distance from the second sub object on the user interface.

18. The non-transitory machine-readable medium of claim 16, wherein the operations further comprise:

determining a first display location on the user interface for displaying the first data portion of the first sub object based on a display parameter within the first sub object; and determining a second display location for displaying the second data portion of the second sub object based on an unused display location on the user interface after displaying the first data portion of the first sub object.

19. The non-transitory machine-readable medium of claim 16, wherein the operations further comprise determining that the second data portion of the second sub object corresponds to the second data portion type based on an identifier included in the second data portion of the second sub object.

20. The non-transitory machine-readable medium of claim 16, wherein the operations further comprise:

updating the application from a legacy version to an updated version;

determining that the second sub object is implementable by the updated application;

in response to determining that the second sub object is implementable by the updated application, extracting, from the second sub object, a third data portion corresponding to the first data portion type;

generating a second presentation of the data object based on the first data portion of the first sub object and the third data portion of the second sub object; and providing the second presentation of the data object on the user interface of the device.

* * * * *